United States Patent [19]

Hulin et al.

[11] 4,163,641

[45] Aug. 7, 1979

[54] EXTRUSION TOOL

[75] Inventors: Jean-Pierre Hulin; Michel de Vecchis, both of Paris, France

[73] Assignee: Societe Lignes Telegraphiques et Telephoniques, Paris, France

[21] Appl. No.: 919,268

[22] Filed: Jun. 26, 1978

[30] Foreign Application Priority Data

Sep. 20, 1977 [FR] France .................................. 77 28253

[51] Int. Cl.$^2$ ............................................. B29C 23/00
[52] U.S. Cl. .................................. 425/461; 264/176 R; 425/192 R
[58] Field of Search ................................ 425/461, 375; 264/176 A, 177 R, 192 R

[56] References Cited

U.S. PATENT DOCUMENTS

| 3,632,279 | 1/1972 | Christy et al. | 425/461 |
| 3,825,456 | 7/1974 | Weber et al. | 425/461 |
| 3,924,988 | 12/1975 | Hodge | 425/461 |
| 4,090,828 | 5/1978 | Renegar | 425/192 R |

Primary Examiner—William E. Schulz
Attorney, Agent, or Firm—Kemon & Estabrook

[57] ABSTRACT

An extrusion tool consisting of a stack of thin metal wafers in which apertures have been machined by chemical etching. Each wafer has one or several apertures. For simple profiles the wafers are identical. The apertures in adjacent wafers are angularly offset one with respect of the other for helical extrusion.

5 Claims, 3 Drawing Figures

EXTRUSION TOOL

BACKGROUND OF THE INVENTION AND PRIOR ART

The present invention relates essentially to a method of producing an extrusion tool operating as an extrusion die for non metallic material.

Many types of dies suitable for the extrusion of sectional rods, notably of plastic material, are known; their cost is generally high owing to the required machining precision. High cost is particularly burdensome in the case of research and development laboratories, which often require to test a large number of tools in order to specify the final production tools.

U.S. Pat. No. 3,825,456 discloses a tool made of a stack of glass plates in which apertures are formed through photoetching. Due to poor surface quality of the channels resulting from the stacking of the apertures a capillary glass lining is necessary to provide the smoothness necessary for extrusion. This kind of tool is much too expensive to be usable at the developmental stage.

It is an object of the present invention to provide particularly low price extrusion tools by means of which it is possible to obtain wires or rods of very great variety and complexity of sections.

BRIEF SUMMARY OF THE INVENTION

The invention is essentially characterized in that the extrusion tool is produced by stacking of thin metal wafers in which apertures have been chemically etched which are registered so as to constitute channels corresponding to the cross-section of the object to be extruded. Each corresponding said wafers has a number of apertures to one or more different sections so that one stack may be used for the production of different sections.

In case of complicated profiles, the apertures in each wafer of the stack are gradually different so as to shape gradually the profile.

In accordance with one variant of the invention, the wafers are identical and are so disposed as to have an angular offset which permits the extrusion of a helical section by simple longitudinal flow of the material. In this case, the wafers may be positioned by means of a jig prior to the assembly of the tool. The wafers are associated and locked in position in a manner known per se, for example by clamping.

The chemical etching used for the machining of the wafers is very economical and rapid and affords all the precision in the detail of the section that may be required for a die. Experience has shown that in the case of polyethylene extrusion a stack having a length of less than 5 cm is sufficient to produce a high precision extruded rod in the case of a cylindrical section. In the case of a helical structure, the length of the stack is related to the pitch of the helix.

BRIEF DESCRIPTION OF THE DRAWINGS

The invention will be readily understood from the following description and by reference to the accompanying figures, which are given by way of non limiting illustration and in which.

DETAILED DESCRIPTION OF THE DRAWINGS

Figure 1:
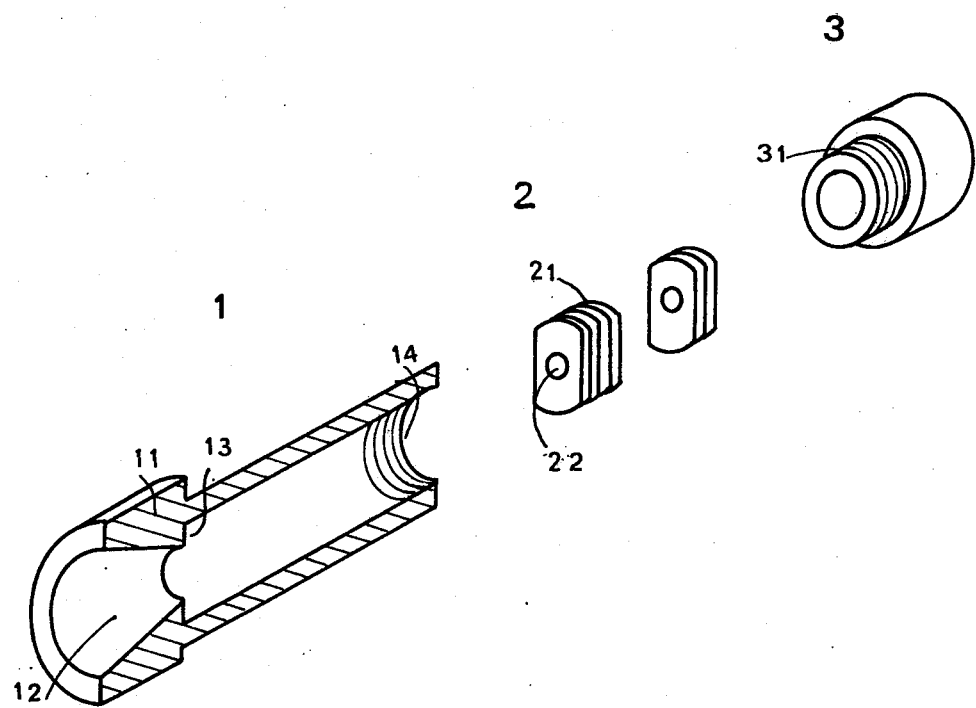
FIG. 1 is an exploded view of a tool according to the invention.

FIG. 1 is an exploded view of a die according to the invention, consisting essentially of three elements, namely a cylindrical casing 1, illustrated in section in the figure, which has at one of its ends a mouthpiece 11 formed with a central conical aperture 12 intended to guide the material through the die, while the other end of the mouthpiece 11 is terminated by a shoulder 13 against which bear the shaping wafers 21 of the die 2. The terminal circular cross-section of the mouthpiece 11 in the plane of the shoulder 13 is designed to transmit the flow of material necessary for extruding the sectional rod. For example, in the case of a section of the shape machined by a tool made of wafers such as 21 corresponding to FIG. 2, the cross-section at 13 is equal to the real surface of the aperture 22. The other end of casing 1 is terminated by a screwthread 14 intended to receive the nut 3 for clamping the wafers 21. The wafers constituting the active part of the die, consist of thin wafers such as 21, which are generally made of metal and are machined with at least one aperture 22, one particular form of such wafers being illustrated on a larger scale in FIG. 2. When the die is intended for the extrusion of a cylindrical section, the various wafers 21 are identical.

Figure 2:
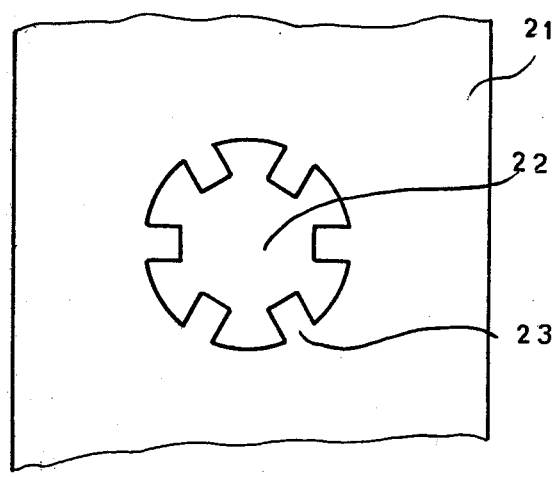
FIG. 2 is a view, drawn to a larger scale, of a wafer used in the production of the tool.

In accordance with the essential feature of the invention, the aperture 22 is obtained by chemical etching of the metallic wafer constituting one of the elements 21. This technique, which is well-known to the person skilled in the art, consists essentially in using a chemical reactant which etches the metal of the wafer applied on both faces of the wafer coated with a protective coating except for the place where aperture 22 is to be formed. For example a photosensitive resin is used as a coating. It is exposed to light through a mask representing the aperture to be provided and washed to eliminate the coating at the aperture location in the usual manner. The echtant is then applied to the wafer. The profile of the aperture 22 illustrated in FIG. 2 is shown by way of non limiting illustration. The aperture 22, of generally circular form, has six radial slots such as 23 which are distributed regularly around the circumference of the circle. A section rod reproducing the shape of the aperture 22 and of high density polyethylene can be obtained from a stack of 50 wafers 21 made from a stainless steel sheet 0.5 mm thick, with a precision of 0.1 mm, operating at 150° C. and at a line speed of 0.15 ms$^{-1}$. Several tens of kilometer of polyethylene rod have been extruded with the same tool constructed as mentioned above.

The stack of wafers 21 is disposed in the casing 1 in such manner that the first wafer bears against the shoulder 13. The relative positioning of the wafers is obtained by threading them on to a jig which is positioned by taking as reference surface the conical aperture 12 and the wafers are made fast by screwing the screwthreaded head 31 of the nut 3 into the screwthread 14.

To obtain a helical section, it is necessary to establish an angular offset between the wafers 21 successively disposed in the casing 1. The relative positioning of the wafers is obtained with the aid of a cylindrical jig machined by any means known per se and formed with the helical profile to be reproduced by the extruded rod or with a part thereof. More particularly in the case of the aperture illustrated in FIG. 2, the positioning may be effected from a single one of the six slots 23. The fastening is effected as before.

Sectional rods of more complex cross section are obtained by gradual extrusion of the section using wafers 21 the aperture 22 of which varies along the stack so as to ensure the gradual shaping of the section and to facilitate the flow of the material. The variation of the aperture 22 decreases the space gradient of the speed of the material during extrusion and hence the risk of deterioration of the material due to stagnation within the die.

Figure 3:
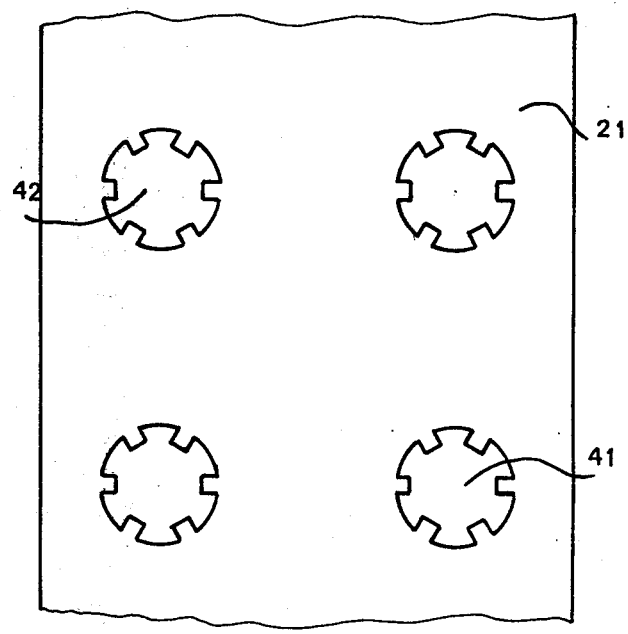
FIG. 3 is a view of another variant of the wafer.

FIG. 3 illustrates a variant of a wafer 21 which has a number of apertures such as 41, 42 obtained in the manner specified in the foregoing by chemical etching. In the case of cylindrical sections, a number of sections may be simultaneously obtained from one stack of such wafers in the course of the same extrusion. The rate of flow of the material set by the mouthpiece must be accordingly adapted. It is also possible to extrude successively each of the sections defined by the apertures of one type, such as 41, with a stack of such wafers associated with an appropriately oriented mouthpiece.

What we claim:

1. An extrusion tool consisting of a stack of a few tens of metal wafers a few tenths of millimeter thick made fast with one another, having apertures which are complementary to the profiles of the rods to be extruded said apertures being produced by chemical etching.

2. Tool according to claim 1, wherein the apertures in said wafers are identical.

3. Tool according to claim 1, wherein the apertures of the wafers have a form which gradually varies from one wafer to the next in the stack.

4. Extrusion tool consisting of a stack of a few tens of metal wafers a few tenths of millimeter thick made fast with one another, having one aperture which is complementary to the profile of the rod to be obtained, said apertures being produced by chemical etching.

5. Tool according to claim 4, wherein the apertures of adjacent wafers are angularly offset from one another.

* * * * *